Feb. 11, 1941.

E. M. BOUTON ET AL

2,231,700

ELEVATOR ZONING APPARATUS

Filed May 16, 1939

WITNESSES:
E. A. McCloskey
[signature]

INVENTORS
Edgar M. Bouton, Harold W. Williams
and Charles F. Carney.
BY [signature]
ATTORNEY

Feb. 11, 1941.  E. M. BOUTON ET AL  2,231,700

ELEVATOR ZONING APPARATUS

Filed May 16, 1939   8 Sheets-Sheet 7

Fig. 4A.

WITNESSES:

INVENTORS
Edgar M. Bouton, Harold W. Williams
and Charles F. Carney.
BY
ATTORNEY Feb. 11, 1941.  E. M. BOUTON ET AL  2,231,700
ELEVATOR ZONING APPARATUS
Filed May 16, 1939    8 Sheets-Sheet 8

WITNESSES:
INVENTORS
Edgar M. Bouton
Harold W. Williams and Charles F. Carney
BY
ATTORNEY Patented Feb. 11, 1941

2,231,700

UNITED STATES PATENT OFFICE 2,231,700

ELEVATOR ZONING APPARATUS

Edgar M. Bouton, Nutley, and Harold W. Williams, Jersey City, N. J., and Charles F. Carney, Chicago, Ill., assignors to Westinghouse Electric Elevator Company, Jersey City, N. J., a corporation of Illinois Application May 16, 1939, Serial No. 273,856

20 Claims. (Cl. 187—29)

Our invention relates to elevator systems of the type in which the hatchway is divided into a number of zones of floors which are assigned to various cars for the purpose of controlling the registration of calls, automatic stopping of the cars, energization of floor lanterns or other signals, or, in general, for any purpose for which it is convenient to so divide the hatchway. As examples of the classes of systems to which the invention is particularly applicable, the systems disclosed in the U. S. Patent to W. F. Eames, No. 2,104,478, granted January 4, 1938 and assigned to the Westinghouse Electric Elevator Company, and the patent to R. W. Jones, No. 2,104,522, granted January 4, 1938 and assigned to the Westinghouse Electric Elevator Company, may be mentioned.

It is an object of our invention to provide novel and simplified apparatus for dividing the hatchway into zones, which will utilize a circuit controlling device, which may be similar to the floor selector commonly provided for commutating circuits of the systems in accordance with the position of the car, but which will be driven at a rate of speed independent of the movements of the car.

Other objects of our invention will become evident from the following detailed description, taken in conjunction with the accompanying drawings, in which Figs. 2A to 4A are diagrammatic views showing the mechanical relationship of the coils and contacts of various relays shown in Figs. 2 to 4, inclusive. Figs. 2A to 4A may be arranged beside the corresponding Figures 2 to 4, inclusive, to facilitate the location of the various coils and contacts. The coils and contacts of Figs. 2A to 4A are at approximately the same levels, from top to bottom of the figure, as the corresponding elements of Figs. 2 to 4, Figs. 5 and 6 are diagrammatic views showing the mechanical relationship of certain parts of the main floor selectors and of the auxiliary floor selectors used in the practice of our invention.

In order to reduce circuit complications to a minimum, the control circuits for two cars A and B only, are shown herein. It will be understood, however, that similar circuits will be provided for each car of a bank, which might comprise, for example, six cars. Similarly, the dispatcher has been illustrated as applied to four cars A, B, C, and D, but it will be understood, however, that it may be expanded by duplication of apparatus for a larger number of cars as, for example, six cars. In order to eliminate unnecessary multiplication of parts for the various floors, the invention has been illustrated as applied to a bank of cars operating between the first and ninth terminals, and the apparatus for a large number of intermediate floors, the third to the sixth, which is a duplication of similar apparatus for the second floor, for example, has been omitted to simplify the circuits. It will be obvious, however, that the system may be extended to include as many floors as desired.

Wherever possible, the apparatus which is individual to car B has been given the same reference character as the corresponding element of car A, with the exception that the prefix B is used to indicate that the apparatus is individual to car B. As the operation of car A will be described in detail, the prefix A has been omitted from the reference character pertinent thereto, in order to reduce the number of symbols making up each reference character used in the description.

The control apparatus individual to car A, which is duplicated for the other cars, such as B, is listed below. The control apparatus, except the dispatcher, common to cars A and B, is listed in a separate schedule, and the dispatcher apparatus for cars A, B, C and D is listed in a third schedule.

Control apparatus individual to Car A

U—Up direction switch
D—Down direction switch
W—Up direction preference relay
X—Down direction preference relay
M—Brake relay
SU—Up selector relay
SD—Down selector relay
N—Selector stopping relay
9DS
8DS
7DS } —Down zoning relays
2DS
8US
1US } —Up zoning relays

Control apparatus (exclusive of dispatcher) common to all cars

9DR—Upper terminal call relay
8DR
7DR } —Down call relays
2DR
8UR—Up call relays
1UR—Lower terminal call relay

Dispatcher apparatus

AND—Next down relay car A
BND—Next down relay car B
CND—Next down relay car C
DND—Next down relay car D
ANU—Next up relay car A
BNU—Next up relay car B
CNU—Next up relay car C
DNU—Next up relay car D.

Figure 1:
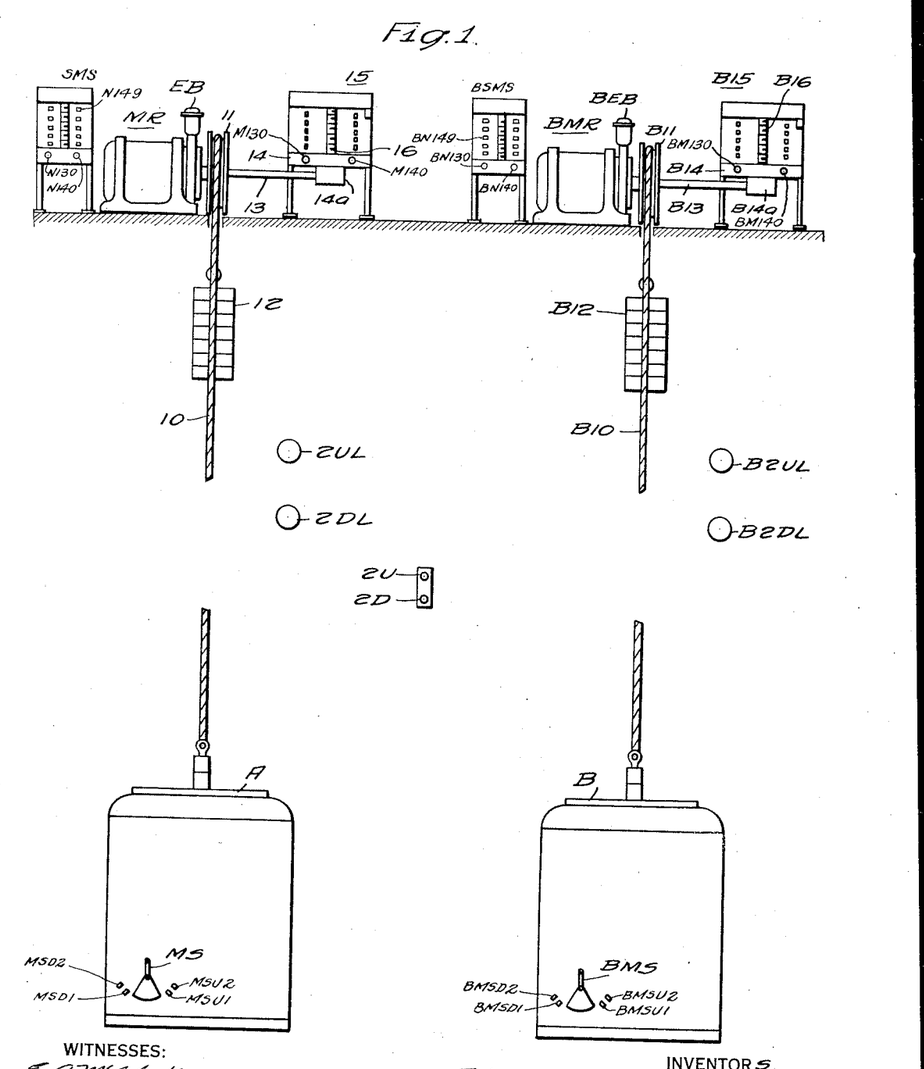
Figure 1 is a diagrammatic view illustrating the arrangement of two elevator cars A and B in a hatchway, and the principal motor and control apparatus associated with the cars, Figs. 2 to 4, inclusive, are diagrammatic views showing the circuit connections of various electrical elements used in the practice of our invention. These figures may be assembled vertically, in numerical order with Fig. 2 at the top, to illustrate the circuit features of the invention.

Apparatus shown in Fig. 1 of the drawings

Referring particularly to Fig. 1 of the drawings, it will be observed that car A is arranged to be supported in a hatchway by means of a cable 10 which is passed over a sheave 11 and secured to a suitable counterweight 12. The sheave 11 is mounted for rotation with a shaft 13 which is driven by motor MR. A brake EB of the usual spring-operated, electromagnetically-released type, is provided for stopping further rotation of the sheave 11 when the motor MR is deenergized.

Position responsive apparatus, of any suitable type, such as a floor selector 15, is provided for commutating various circuits of the system in accordance with the position of car A. As illustrated, the shaft 13 is extended and is arranged to operate a brush carriage 14 by means of suitable speed-reducing gearing 14a and a lead screw 16. The brush carriage 14 carries a number of brushes, each of which successively engages a row of stationary contact devices, or segments, corresponding to the floors of the building, upon movement of the carriage by the car. Each of the selector brushes such as M130 or M140, in engaging a contact device or segment, renders it effective to complete a circuit, as is well understood in the art. For simplicity, only the two moving brushes M130 and M140 and the cooperating two rows of contact devices or segments are illustrated in Fig. 1, but it will be understood that in practice a much larger number of brushes and rows of contact segments are provided, as will be hereinafter more fully described in connection with Fig. 5. Forms of selectors other than the simplified form shown, may, of course, be used in accordance with the usual practice.

An auxiliary floor selector SMS is provided for car A and a similar auxiliary floor selector BSMS is provided for car B. Each car in the system will be provided with its own auxiliary floor selector in addition to its own position responsive selector. The auxiliary selector SMB is provided with a selector arm N14 which may be moved over rows of stationary contact segments such as N138. A plurality of brushes such as N130 are mounted on the arm so that movement of the arm moves the brushes sequentially into engagement with the contact segments. The arm is moved by a screw shaft N16 operated by a motor SM. The motor SM moves the arm ahead of the car but independently of the position of the car.

At each floor, hall lanterns are provided over each hatchway door, or at other suitable locations, to indicate which car will answer a call. As illustrated in Fig. 1 of the drawings, hall lanterns 2UL and 2DL are illustrated as being individual to car A for the second floor. It will be understood that similar hall lanterns are provided for the other cars and for each floor between the terminals. At the terminal floors, only one lantern, per car, is required in accordance with the usual practice.

In order to provide for registering calls at the floors, hall call buttons are provided at each floor intermediate the terminals, preferably one button being common to all of the cars, for each direction of car travel. As illustrated, the second floor is provided with an up hall call button 2U and a down hall call button 2D. The other intermediate floors are similarly provided with hall call buttons, and a single hall call button is provided at the terminal floors.

In order to start car A in either direction, a master switch MS is provided within the car in a position convenient to be controlled by the operator. The master switch MS includes an energizing segment which normally stands in a central position, but is rotatable in either direction to two successive positions to effect starting and acceleration of the car in corresponding directions of car travel. Although in the majority of applications, the invention would be used in connection with automatic slowdown and stopping apparatus for effecting automatic stops of the cars at the various floors in a manner well-understood in the art, such apparatus is unnecessary to an understanding of the invention, and, for simplicity, has been omitted.

Figure 5:
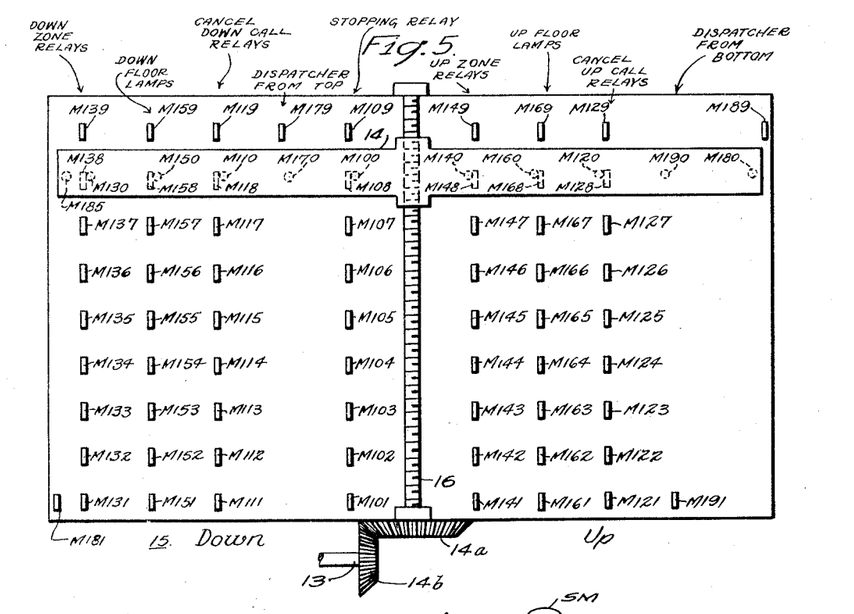
Figure 6:
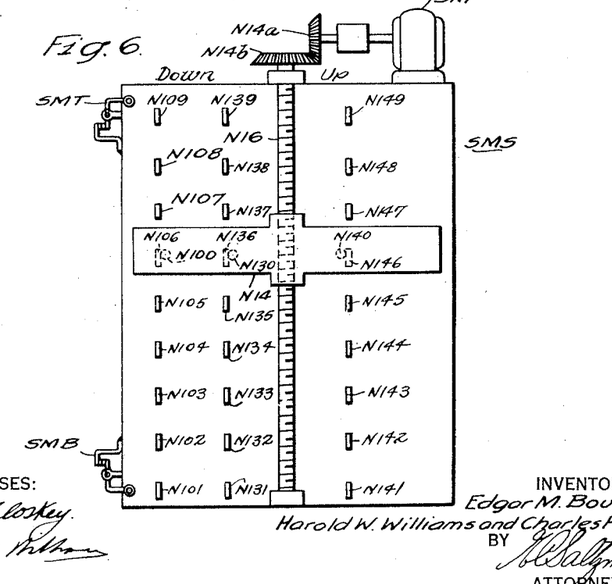

Apparatus shown in Figs. 5 and 6 of the drawings

Referring to Fig. 5 of the drawings, one construction of position-responsive device or floor selector, suitable for the practice of the invention, is illustrated therein. In this figure, an elongated brush carriage 14 is movable vertically to traverse a number of individual groups of stationary contact devices or segments, M109, M138, corresponding to the various floors served by the car. The brush carriage 14 is driven by means of a lead screw 16 and by suitable bevel gears 14a and 14b from the shaft 13, mentioned in connection with Fig. 1. The gear ratio of the gears 14a and 14b is such that the brush carriage 14 traverses the distance between successive horizontal rows of stationary contact segments, while the car is traveling the distance between corresponding successive floors in the hatchway. The prefix M is used to distinguish the contact segments of the main selector in the various figures.

Fig. 6 shows a similar simplified construction for the circuit-controlling device, or auxiliary floor selector SMS, mentioned above. In the Fig. 6 construction, a movable member, such as a brush carriage N14, is driven by means of a lead screw N16 and gears N14a and N14b from a suitable source of power, such as an auxiliary motor SM. The brush carriage N14 is arranged to move brushes such as N100 to operatively engage suitable stationary contact elements such as N108, N107, etc., sequentially in the order of corresponding floors. The contact elements N108, N107 of the auxiliary floor selector, are distinguished from corresponding segments of the main floor selector by the prefix N. A pair of limit switches SMT and SMB, of any suitable construction, are provided for interrupting the circuit of the auxiliary motor SM at the limits of travel of the movable member or brush carriage N14, corresponding to the upper and lower terminal floors.

The motor SM is started by preparation of the car to start and it moves the carriage or arm N14 over the stationary contact segments independently of the movement of the car and at a speed somewhat greater than the speed of the car so that it will, when started, overtake the next car ahead of the car to which it belongs. When it overtakes the next car ahead it is stopped by that next car ahead, but restarts when said next car ahead starts, as will be described later. There is no direct relationship between the speed of the hoisting motors and the selector motor SM, and in fact there is no speed too high for the motor SM except as produced by natural limitations, such as ability to stop it accurately, etc., when it catches up with the position of the next car ahead.

Figure 2:
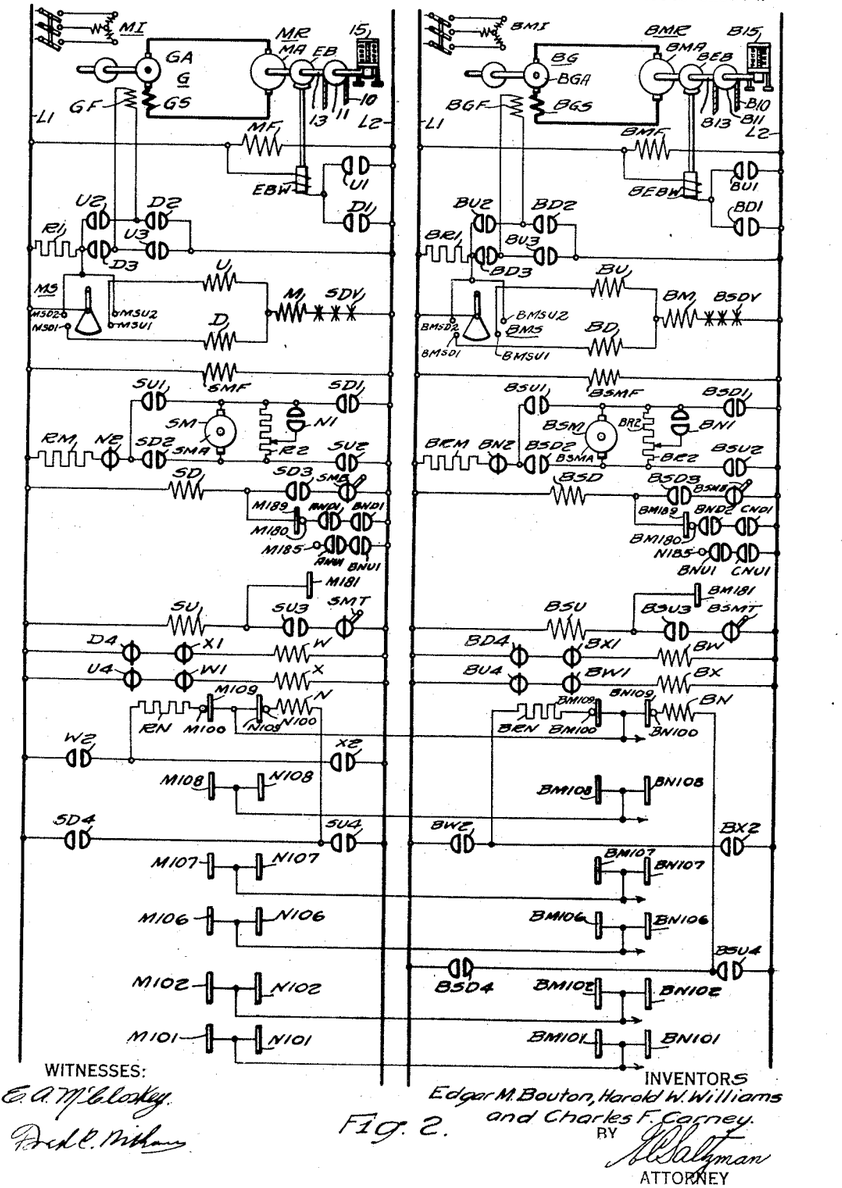
Figure 2A:
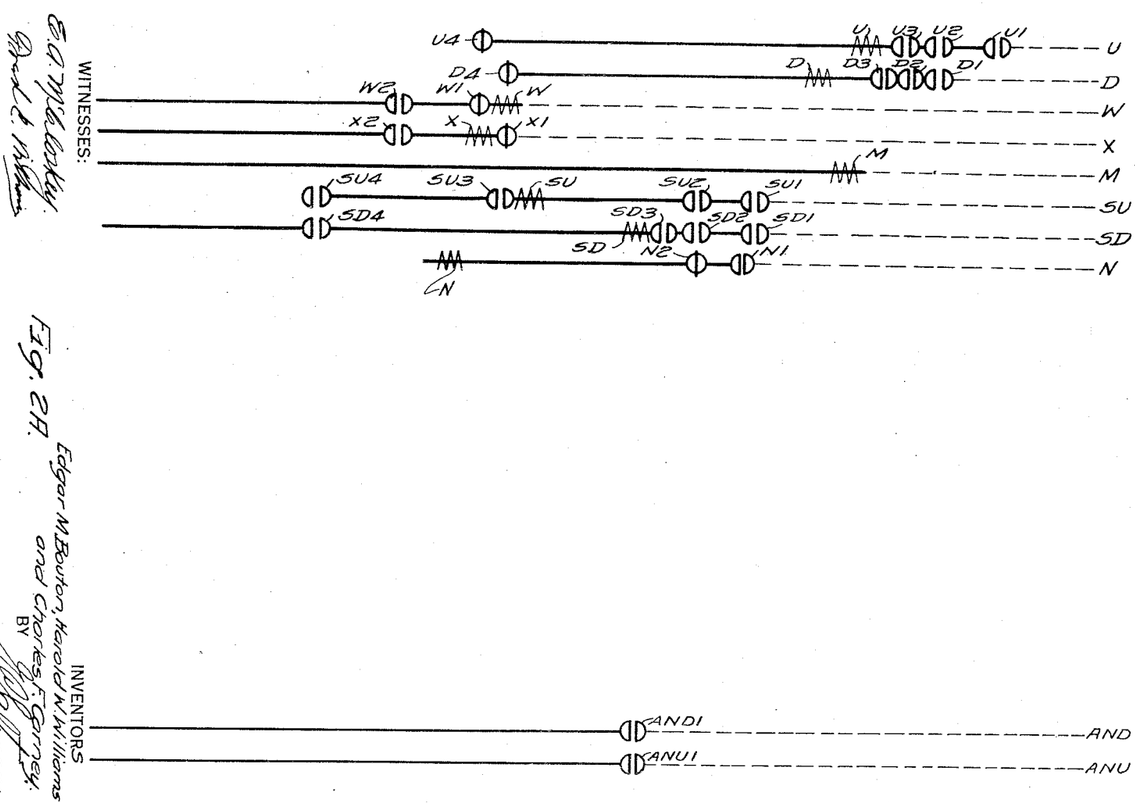

*Apparatus shown in Fig. 2 of the drawings*

Referring particularly to Fig. 2 of the drawings, it will be observed that on the left-hand side, control circuits individual to car A are shown, and, on the right-hand side, the circuits shown are individual to car B.

As shown in Fig. 2, the motor MR is of the shunt type, and is provided with an armature MA which is mechanically connected to the shaft 13 for driving the sheave 11. The brake EB is provided with a release winding EBW which is energized, on energization of the motor MR, to permit rotation of the latter. The motor MR includes the usual shunt-type main field winding MF, which is connected for energization between supply conductors L1 and L2. The armature MA of motor MR is connected in a loop circuit with the armature GA of a suitable direct-current generator G, driven by any suitable means such as an induction motor MI.

In order to control the direction and value of the voltage generated by the armature GA, the generator G is provided with a separately excited main field winding GF. A field resistor R1 is included in the circuit of field winding GF, in order to provide speed control for the motor MR. The generator G is provided with suitable apparatus for correcting the speed regulation of motor MR, shown for simplicity as a series field winding GS.

The master switch MS, previously described as located in car A, is here shown connected to selectively control the energization of the operating windings of an up direction switch U and a down direction switch D. The direction switches U and D are provided with contact members, as illustrated, for reversing the connections of the generator field winding GF to the conductors L1 and L2, depending upon the direction in which it is desired to operate the elevator car. When either the up or the down direction switch U or D is energized, a brake relay M is also energized to perform functions which will be set forth hereinafter.

The auxiliary motor SM, mentioned in connection with Fig. 6, is preferably of the shunt-type, provided with a shunt field winding SMF energized from the supply conductors L1 and L2. The armature SMA of the auxiliary motor SM may be connected to the supply conductors L1 and L2, in series with a resistor RM, by means of an up selector relay SU or a down selector relay SD, depending upon the direction of movement of the associated brush carriage (not shown in Fig. 2) desired.

A potentiometer resistor R2, controlled by a selector stopping relay N, is provided for reducing the voltage applied to the armature SMA, and, accordingly, the speed of the auxiliary motor SM, when the later is to be stopped.

The up selector relay SU and the down selector relay SD are designed to close with a time delay of the order of one-half second. The selector stopping relay N is so designed that upon energization of its operating coil, its front contacts N1 close immediately, but its back contacts N2 are delayed for a time interval of the order of one-quarter second before opening. When the operating coil of the relay N is deenergized, however, the back contacts N2 close immediately and, after the expiration of the time delay of one-quarter second, the front contacts N1 open. As relay designs capable of performing the contact operations of relay N are well known in the art, detailed illustration of the latter relay has been omitted. For the purpose of performing certain functions which depend upon the direction of movement of the elevator car, up and down direction preference relays W and X, respectively, are provided. The operating coils of these relays are controlled, respectively, by back contacts of the direction switches U and D. The direction preference relays W and X are interlocked in any suitable manner, as by means of back contacts, so that both relays cannot remain closed at the same time.

Referring to the lower part of Fig. 2, certain stationary contact segments of the main floor selector 15, such as the contact segment M109, are connected by common circuits to corresponding contact elements, such as N109 for the corresponding floor, of the auxiliary floor selector SMS, and also to corresponding segments of the main and auxiliary floor selectors for all the other cars. The purpose of these common circuits is to arrest the movement of any auxiliary selector when it approaches a position corresponding to a floor occupied by another car prepared for movement in the same direction as the car with which the auxiliary selector is associated.

The operating coil of the selector stopping relay N is arranged to be connected between one or the other supply conductors L1 or L2, and the auxiliary floor selector segment N109, for example, corresponding to the position of the brush carriage N14 (shown in Fig. 6) of the auxiliary floor selector. Similarly, a resistor RN is arranged to be connected between either supply conductor L1 or L2 and the main floor selector contact element corresponding to the floor at which car A is situated. As car A is assumed to be standing at the upper terminal, the movable brush M100 of the main floor selector 15, to which the resistor RN is connected, is in engagement with the contact element M109 corresponding to the ninth or upper terminal floor.

The connections of the selector stopping relay N and resistor RN to the floor selector brushes M100 and N100, as shown in the lower part of Fig. 2, are such as to effect energization of the selector stopping relay N when car A arrives at a position in the hatchway less than one floor behind some other car prepared for travel in the same direction. Similarly, the corresponding selector stopping relay BN for car B is operated when car B approaches within one floor height of car A or of any other car traveling in the same direction as car B.

The resistors RN and BRN are provided to prevent a short-circuit between the supply conductors L1 and L2 when two cars prepared for movement in opposite directions arrive at the same floor. Preferably, the resistors RN and BRN are so designed that, at the normal voltage of supply conductors L1, L2, these resistors draw many times the minimum current required to operate one of the selector stopping relays N or BN. The latter relays are designed to operate at a comparatively small percentage of the normal voltage of supply conductors L1 and L2, for example 15%. With the resistors RN and BRN and the relays N and BN designed as indicated, correct operation of the latter relays will occur when the corresponding cars arrive at a floor where several other cars are already standing.

Figure 3:
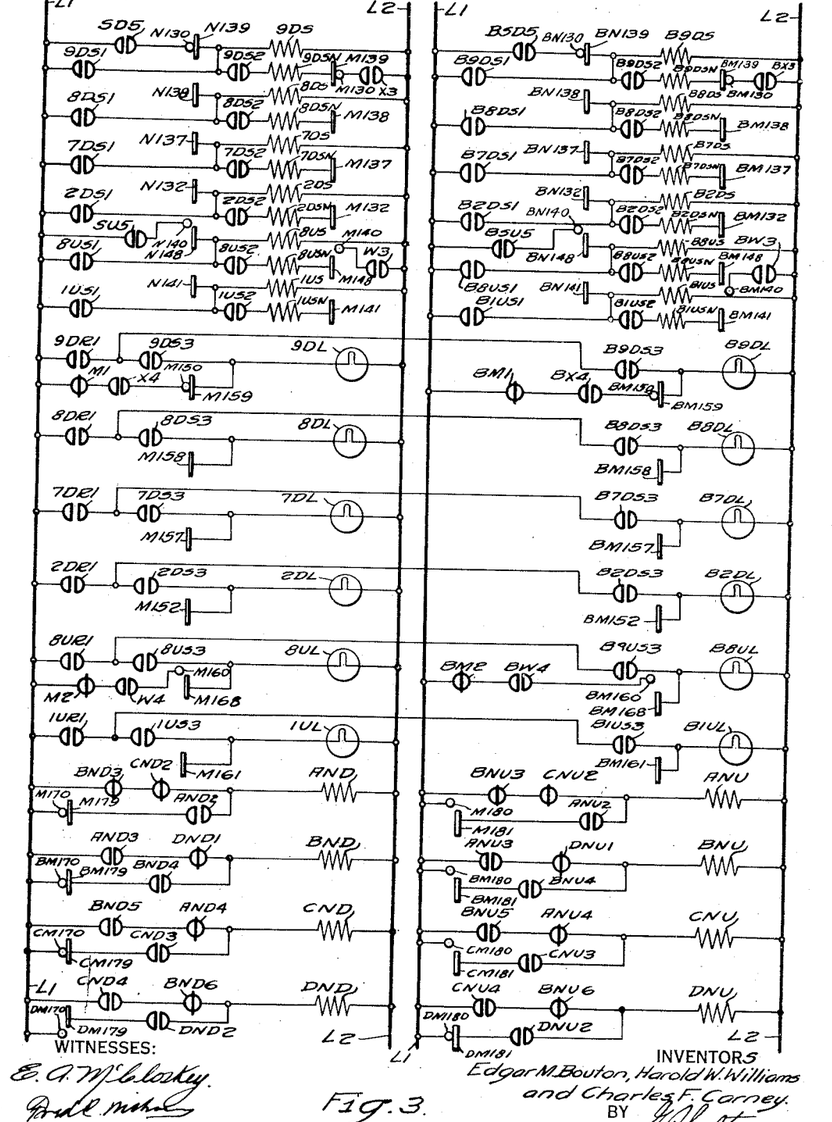
Figure 3A:
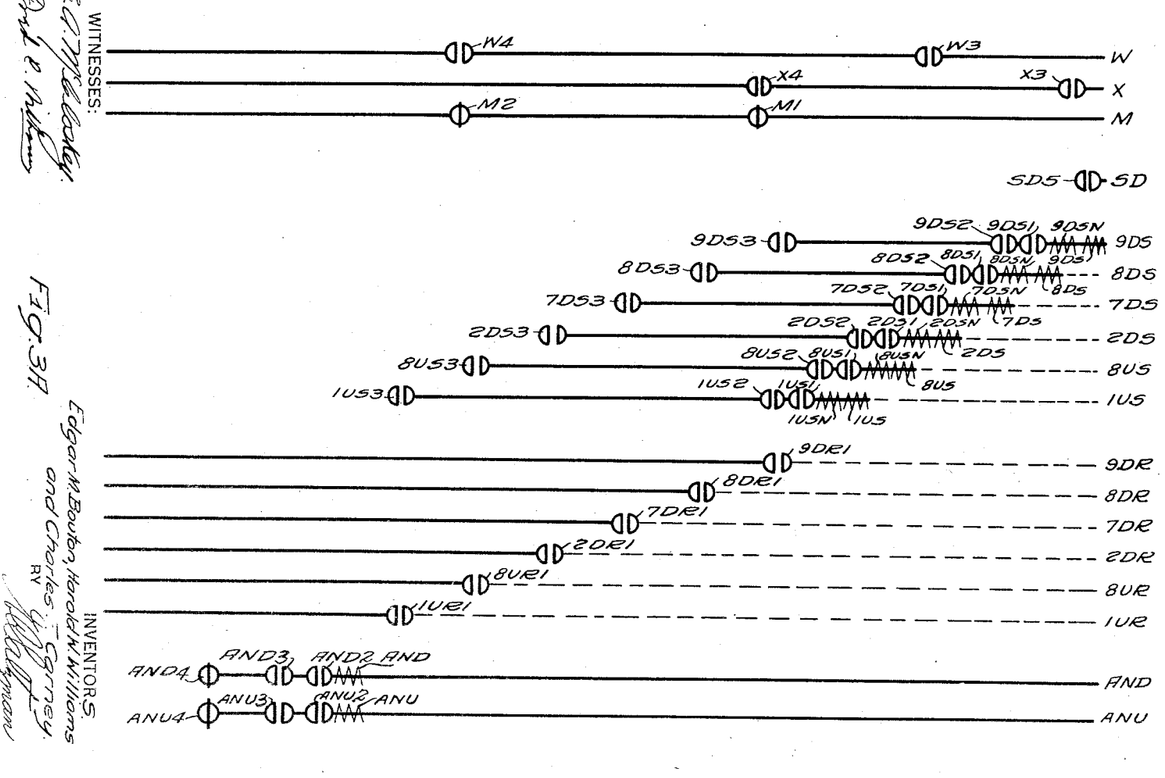

*Apparatus shown in Fig. 3 of the drawings*

Referring to Fig. 3, a plurality of zoning relays 9DS, 8DS, 7DS and 2DS are provided for car A for the down direction of car travel, and a similar group 8US and 1US is provided for the up direction of car travel.

Each of the zoning relays 8DS, 7DS, etc., is provided with an operating winding designated by the same reference character as the relay as a whole, and with a demagnetizing winding such as 8DSN, which serves, when energized, to neutralize the effect of the corresponding energizing winding. These relays are so designed, that upon energization of the operating winding, such as 8DS, the front contacts of the corresponding relay close, and the back contacts of the relay open, and, the front and back contacts remain in the indicated position as long as the operating winding, such as 8DS, is energized and the demagnetizing windings 8DSN remain deenergized. If the circuit of the operating winding, such as 8DS, is interrupted, the front contacts of the relay open and its back contacts close. Similarly, if while the operating winding 8DS is energized, the corresponding demagnetizing winding 8DSN becomes energized, the front contacts of the relay will open, and the back contacts will close.

Although, in a complete system, one zoning relay would be provided for each car for each terminal floor, and two zoning relays per car per floor would be provided for intermediate floors, for simplicity, zoning relays have been illustrated only for the ninth, eighth, seventh and second floors in the down direction, and the first and eighth floors in the up direction. Other relays and elements, repeated for all floors, are similarly illustrated in reduced number.

The floor lanterns and associated energizing circuits are shown in the central part of Fig. 3. As indicated above, an up floor lantern, such as lantern 8UL and a down floor lantern, such as 8DL, are provided for each car at each intermediate floor, and are preferably located above the hatchway door for the corresponding car.

A simplified form of dispatcher, for distributively selecting cars for departure from the upper and lower terminals, and for controlling the intervals between departures, is shown in the lower part of Fig. 3. As shown, this dispatcher consists simply of a next down relay AND, BND, CND and DND, for each car, and a next up relay ANU, BNU, CNU and DNU, for each car, provided with interlocked closing circuits and with holding circuits controlled by terminal position floor selector segments of the corresponding car. It will be understood that in practice a much more elaborate form of dispatcher may be utilized, as is well understood in the art. For example, the dispatcher illustrated and described in the H. W. Williams et al. Patent No. 2,151,819, dated March 28, 1939, and assigned to Westinghouse Electric Elevator Company, may be used, the "next" relays AND, BND, etc., of that patent being substituted for the relays AND, BND, etc., of this application to dispatch the cars at regular intervals of time.

Figure 4:
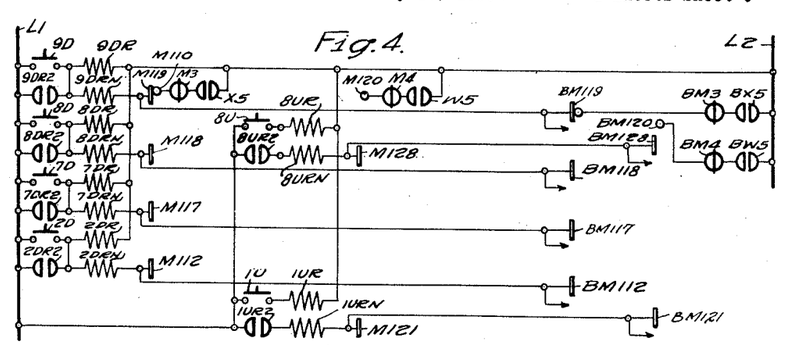
Figure 4A:
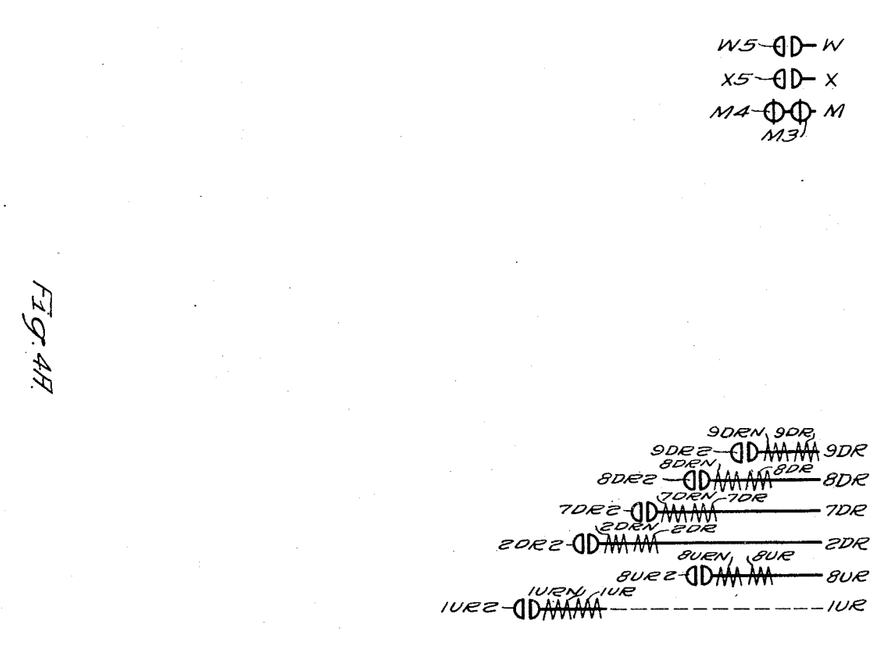

*Apparatus shown in Fig. 4*

Referring to Fig. 4, a group of up call relays of which only one, 8UR, is shown, each common to all of the cars of the bank, is provided for registering calls for service for each intermediate floor, and a lower terminal call relay 1UR is provided for registering calls for service for the lower terminal. Similarly, a group of down call relays 8DR, 7DR, and 2DR, is provided for registering calls for service in the down direction for the intermediate floors, and an upper terminal call relay 9DR is provided for registering calls at the upper terminal. The call relays 8UR, 8DR, etc., are similar in construction and operation to the zoning relays 8DS, etc., described in connection with Fig. 3, and are controlled by push buttons 8U, 8D, etc., located at the various floors, in accordance with the usual practice.

*Operation of the system*

The operation of the above described apparatus may be set forth as follows, assuming that the various induction motors, such as M1 are in operation, and that initially cars A, B and C are standing at the upper terminal, and car D is standing at the lower terminal:

As the up direction switch U of car A had been previously closed during operation of the latter car to the upper terminal, the circuit of down-direction preference relay X was opened at contacts U4 (Fig. 2) and a circuit for the up-direction preference relay W completed as follows, referring to Fig. 2:

L1; D4; X1; W; L2

As the up direction preference relay W is in energized condition, its back contacts W1, in the circuit of relay X (Fig. 2) are open; its front contacts W2 (Fig. 2) are closed; its front contacts W3 and W4 (Fig. 3) are closed; as are its front contacts W5 (Fig. 4).

As car B is also standing at the upper terminal, a circuit is completed for the up direction preference relay BW for car B, similar to that traced above for the relay W.

*Operation of zoning mechanism with no cars in advance of car receiving zone*

Referring to Fig. 3, a circuit is completed for the next down relay AND for car A, which may be traced as follows:

L1; BND3; CND2; AND; L2

In response to completion of the latter circuit, the next down relay AND for car A is energized to effect closure of its contacts AND1 (Fig. 3); to effect closure of its contacts AND2 (Fig. 3), thereby completing a holding circuit for the next down relay AND; to effect closure of its contacts AND3 (Fig. 3), thereby completing a circuit for the next down relay BND; and to open its contacts AND4 (Fig. 3) which are at this time without effect. The holding circuit for the next down relay AND, mentioned above, may be traced as follows, referring to Fig. 3:

L1; M170; M179; AND2, AND; L2

The energizing circuit for the next down relay BND, completed upon closure of contacts AND3 (Fig. 3) of next down relay AND may be traced as follows, referring to Fig. 3;

L1; AND3; DND1; BND; L2

Upon completion of the latter circuit, the next down relay BND of car B closes to effect closure of its contacts BND1 (Fig. 2), thereby completing a circuit for the down selector relay SD, to close its contacts BND2 (Fig. 2), which are at this time without effect; to open its contacts BND3 (Fig. 3), which are also without effect at this time; to close its contacts BND4 (Fig. 3), thereby completing a holding circuit for the relay BND; to close its contacts BND5 (Fig. 3), which are without effect at this time; and to open its back contacts BND6 (Fig. 3), which are also without effect at this time.

As mentioned above, the closure of contacts BND1 (Fig. 2) of next down relay BND completes a circuit for the down selector relay SD (Fig. 2), which circuit may be traced as follows, in the latter figure:

L1; SD; M189; M180; AND1; BND1; L2

Upon energization of its operating coil in the circuit traced above, the down selector relay SD closes its contacts SD1 and SD2 (Fig. 2) to thereby complete a circuit for the auxiliary motor SM; closes its contacts SD3 (Fig. 2) to thereby complete a holding circuit for itself; closes its contacts SD4 (Fig. 2), which latter are ineffective to cause energization of the selector stopping relay N, at this time, as resistors RN and BRN are both connected to supply conductor L1, through contacts W2 and BW2, respectively. The down selector relay SD, in closing, also closes its contacts SD5 (Fig. 3) in the circuit of the zoning relays 9DS, etc.

The circuit completed for the auxiliary motor SM by closure of contacts SD1 and SD2, may be traced as follows, referring to Fig. 2:

L1; RM; N2; SD2; SM; SD1; L2

Upon energization of the auxiliary motor SM in the circuit traced immediately above, the auxiliary motor SM commences to rotate in a direction to drive the corresponding auxiliary selector brush carriage (not shown in Fig. 2) in the direction corresponding to downward movement of car A. As the brush carriage of the auxiliary floor selector moves downward, it successively completes circuits for the zoning relays 9DS, 8DS and 7DS, etc., to the one corresponding to the lowest intermediate floor 2DS. The circuit for the zoning relay 9DS, completed by such downward movement of the auxiliary floor selector brush carriage, may be traced as follows, referring to Fig. 3:

L1; SD5; N130; N139; 9DS; L2

Upon completion of the latter circuit, the zoning relay 9DS is energized to effect closure of its contacts 9DS1, (Fig. 3), to thereby complete a holding circuit for itself; and to effect closure of its contacts 9DS2 (Fig. 3) and 9DS3 (Fig. 3) both of which are at this time ineffective to perform any operation additional to the preparation of circuits. The other zoning relays 8DS etc., for the down direction, similarly close and complete holding circuits for themselves.

*Registration of hall call*

Assuming that a prospective passenger at the eighth floor desires passage in the downward direction, he operates the floor push button 8D (Fig. 4) corresponding to the downward direction of car travel for the corresponding floor. Upon operation of the push button 8D, a circuit is completed for the down call relay 8DR for the eighth floor, which circuit may be traced as follows, referring to Fig. 4;

L1; 8D; 8DR; L2

In response to completion of the later circuit, the down call relay 8DR closes to effect closure of its contacts 8DR1 (Fig. 3), thereby completing an energizing circuit for the down floor lantern 8DL; and to effect closure of its contacts 8DR2 (Fig. 4) thereby completing a holding circuit for the down call relay 8DR itself.

The circuit completed for the down floor lantern 8DL for the eighth floor may be traced as follows, referring to Fig. 3:

L1; 8DR1; 8DS3; 8DL; L2

*Starting of car*

It will be assumed that in response to the call registered at the eighth floor, the operator of car A is apprised of the registered call by suitable signal apparatus known in the art, but which has, for simplicity, been omitted from the present disclosure. The operator of car A accordingly rotates the master switch MS in the clockwise direction to start car A moving downwardly. Upon rotation of car switch MS in the clockwise direction, a common energizing circuit for the down direction switch D and the brake relay M is initially completed by the contacts MSD1 of the master switch, which circuit will be obvious from Fig. 2.

In response to energization of its operating coil, the down direction switch D closes its contacts D1 (Fig. 2), to thereby complete an energizing circuit for the brake release winding EBW; closes its contacts D2 and D3 (Fig. 2) to thereby complete an energizing circuit for the generator separately excited field winding GF in series with the accelerating resistor R1; and opens its back contacts D4 (Fig. 2), to interrupt the circuit of up direction preference relay W.

Similarly, in response to energization of its operating coil, the brake relay M operates to open its back contacts M1 (Fig. 3), thereby interrupting the circuit of the down floor lantern 9DL; and also operates to open its back contacts M2 (Fig. 3), M3 and M4 (Fig. 4), which latter contacts are all at this time ineffective.

Upon interruption of the circuit of up direction preference relay W by contacts D4 (Fig. 2) of down direction switch D, the relay W drops out. The up direction preference relay W, in dropping out, completes a circuit for the down direction preference relay X (Fig. 2) by means of its contacts W1; opens its contacts W2 (Fig. 2) to disconnect resistor RN from supply conductor L1; and opens its contacts W3 (Fig. 3), W4 (Fig. 3) and W5 (Fig. 4).

The circuit of down direction preference relay X, completed by contacts W1, will be obvious from Fig. 2. Upon completion of this circuit, the down direction preference relay X closes, opening its back contacts X1 in the circuit of relay W (Fig. 2); closing its contacts X2 (Fig. 2); closing its contacts X3 in the cancellation circuit of zoning relays 9DS, etc. (Fig. 3); and closing its contacts X4 (Fig. 3) and X5 (Fig. 4).

Upon further rotation of the master switch MS in the clockwise direction, the movable segment of the master switch engages the stationary contact MSD2, thereby completing a shunt circuit around the resistor R1, to increase the excitation of the generator G.

As the brake EB is now released, and the generator field winding GF is connected for maximum excitation of the generator G, the motor MR rapidly accelerates to full speed, driving car A in the downward direction.

Operation of zoning mechanism with a car in advance of car receiving zone

As car A leaves the upper terminal, the movable contact brush M170 of the main floor selector 15 of car A disengages the stationary contact element M179 corresponding to the upper terminal floor, thereby interrupting the circuit of the next down relay AND (Fig. 3) and causing the latter relay to drop out. Relay AND, in dropping out, opens its contacts AND1 (Fig. 2), AND2 (Fig. 3) and AND3 (Fig. 3), all of which are at this time without effect; and completes a circuit for the next down relay CND for car C by means of its contacts AND4 (Fig. 3). The circuit of next down relay CND is similar to that of next down relays AND and BND, traced above, and will be readily understood by reference to Fig. 3.

The next down relay CND, for car C, in closing completes a circuit for the down selector relay BSD for car B by means of its contacts CND1 (Fig. 2); opens its back contacts CND2 (Fig. 3), which are at this time without effect; and completes a holding circuit for itself by means of its contacts CND3 (Fig. 3).

The circuit for down selector relay BSD for car B is similar to that traced above for the down selector relay SD (Fig. 2) and will readily be understood by reference to the latter figure. The down selector relay BSD, in closing, completes a circuit for the auxiliary motor BSM (Fig. 2) for car B by means of its contacts BSD1 and BSD2; completes a holding circuit for itself by means of its contacts BSD3 (Fig. 2); prepares a circuit for the selector stopping relay BN for car B, by means of its contacts BSD4 (Fig. 2); and closes its contacts BSD5 (Fig. 3). The energized selector motor BSM now moves the auxiliary carriage BN14 downwardly ahead of the proposed down run of car B, but as soon as the carriage BN14 catches up with the car ahead it will be stopped by that car, as will be described later.

Stopping of car

As car A approaches the eighth floor, its operator moves the switch MS in counterclockwise direction, thereby initially causing disengagement of the master switch segment with the stationary contact MSD2 and effecting the insertion of the resistor R1 in series with the generator field winding GF. In response to reinsertion of the accelerating resistor R1 in the circuit of the generator field winding GF, the excitation of the generator G is reduced, and the motor MR decelerates to low speed.

Upon further rotation of the master switch MS in the counter-clockwise direction, the master switch segment disengages the stationary contact MSD1, thereby interrupting the common circuit of the down direction switch D and the brake relay M. Upon deenergization of the down direction switch D, the latter switch opens and interrupts the circuit of the brake release winding EBW by means of its contacts D1 (Fig. 2); and also opens the circuit of the generator field winding GF by means of its contacts D2 and D3 (Fig. 2).

As the generator field winding GF is now disconnected and the brake release winding EBW is deenergized, the motor MR is rapidly brought to rest, and car A stops at a position which will be assumed as level with the eighth floor. It will be understood that in the majority of applications of the invention, automatic landing apparatus would be used to effect an automatic stop of the car exactly level with the floor, but, as mentioned above, such apparatus has been omitted from the description.

In response to interruption of its energizing circuit, common with that of down direction switch D, the brake relay M becomes deenergized. The brake relay M, in dropping out, closes its contacts M2 (Fig. 3) without effect; completes a second circuit for the floor lantern 8DL (Fig. 3), additional to that provided by the zoning relay 8DS by means of its contacts M1, as will be obvious from an inspection of Fig. 3; and completes a circuit for the demagnetizing winding 8DRN of the call relay 8DR (Fig. 4) by means of its back contacts M3. The back contacts M4 (Fig. 4) of the brake relay M are also closed at this time, but are without effect except in the preparation of circuits.

In response to energization of the demagnetizing coil 8DRN of the call relay 8DR, the latter relay drops out, opening its contacts 8DR1 (Fig. 3) to thereby interrupt one of the two parallel energizing circuits for the floor lantern 8DL; and opening its contacts 8DR2 (Fig. 4), in its own holding circuit.

During the stopping operation of car A at the eighth floor, the movable brush M130 (Fig. 3) of the main floor selector for car A engages the stationary contact element M138, corresponding to the eighth floor, thereby completing a circuit for the demagnetizing coil 8DSN of down zoning relay 8DS, which circuit may be traced as follows, referring to Fig. 3:

L1; 8DS1; 8DS2; 8DSN; M138; M130; X3; L2

Upon completion of the latter circuit, the down zoning relay 8DS for the eighth floor drops out, opening its contacts 8DS1 (Fig. 3) in its own holding circuit; opening its contacts 8DS2 (Fig. 3) to thereby interrupt the energizing circuit of the demagnetizing coil 8DSN; and opening its contacts 8DS3 (Fig. 3) which interrupts one of the parallel energizing circuits for the down floor lantern 8DL.

Also, the arrival of car A at the eighth floor caused its actual selector brush M100 to engage its contact M108. Therefore, as the auxiliary selector arm BN14 for car B is moving downwardly, it is stopped as soon as it catches up with car A at the eighth floor, because the relay BN brush BN100 then engages the contact segment BN108 while brush M100 of car A is on the contact segment M108, thus energizing the stopping relay BN by the circuit:

L1; BSD4; BN; BN100; BN108; M108; M100; RN; X2; L2

Upon completion of the latter circuit, the selector stopping relay BN closes its contacts BN1 (Fig. 2), thereby decreasing the voltage applied to the armature of auxiliary motor BSM; and, after the expiration of the relay time delay of one-half second, opens its contacts BN2 (Fig. 2) thereby disconnecting the auxiliary motor BSM entirely and the auxiliary selector for car B stops at the eighth floor.

The arrival of the auxiliary selector arm for car B at the eighth floor position also energizes the down zoning relay B8DS by the circuit:

L1, BSD5, BN130, BN138, B8DS, L2

The energized relay B8DS completes a self-holding circuit by its closed contacts B8DS1, prepares a demagnetizing circuit by closing its contacts B8DS2, and prepares a circuit for down lantern B8DL by closing its contacts B8DS3.

Registration of additional call

Assuming now that a prospective passenger at the second floor operates the down floor button 2D, a circuit is completed for the down floor relay 2DR (Fig. 4), similar to that traced above for the call relay 8DR, and the call relay 2DR closes to complete a circuit for the floor lantern 2DL by means of its contacts 2DR1 (Fig. 3); and to establish a holding circuit for itself by means of its contacts 2DR2 (Fig. 4).

It will be assumed that the operator of car A is apprised of the down call existing at the second floor, by a suitable signal device (not shown), as mentioned above, and rotates the master switch MS (Fig. 2) clockwise to again start car A in the downward direction. In response to rotation of the master switch MS in the clockwise direction, the down direction switch D (Fig. 2) and the brake relay M (Fig. 2) close and effect energization of the brake release winding EBW and starting of the elevator motor MR, in the manner heretofore described. In response to further clockwise rotation of the master switch MS, the accelerating resistor R1 (Fig. 2) is short circuited, thereby causing the elevator motor MR to accelerate to full speed as described above under the heading "Starting of car."

Transfer of floor to zone of following car

As car A leaves the eighth floor, moving in the down direction, the movable brush M150 of the main floor selector for car A disengages the stationary contact element M158 (Fig. 3), and the movable contact brush M100 similarly disengages the stationary contact element M108 (Fig. 2). The disengagement of the movable brush M150 from the stationary segment M158 is without effect at this time, but the disengagement of the brush M100 with the stationary contact element M108 interrupts the circuit of the selector stopping relay BN (Fig. 2) for car B. The selector stopping relay BN accordingly drops out, completing a circuit for the auxiliary motor BSM by means of its contacts BN2 (Fig. 2) and, after the expiration of its time element, opening the short circuit existing around part of the potentiometer resistor BR2 to thereby cause the auxiliary motor BSM to accelerate to full speed.

The auxiliary motor BSM operates at full speed in the direction corresponding to downward movement of the car B, and the movable brushes BN100, etc., of the auxiliary floor selector for car B correspondingly move in the down direction from the position corresponding to the eighth floor, so that it follows car A downwardly.

As car A continues in its downward movement toward the 7th floor, the movable contact brush M130 (Fig. 3) of the main floor selector for car A engages the stationary contact element M137, corresponding to the seventh floor, and thereby completes a circuit for the demagnetizing coil 7DSN of the zoning relay 7DS, which circuit may be traced as follows, referring to Fig. 3:

L1; 7DS1; 7DS2; 7DSN; M137; M130; X3; L2

Upon completion of the latter circuit, the down zoning relay 7DS for the seventh floor opens, opening its contacts 7DS1 (Fig. 3), in its own holding circuit; opening its contacts 7DS2 (Fig. 3) to thereby interrupt the energizing circuit for the demagnetizing coil 7DSN; and opening its contacts 7DS3 (Fig. 3), which latter are at this time without effect.

Simultaneously with the engagement of floor selector elements M130 and M137, as described above, the movable brush M100 of the main floor selector engages the stationary contact element M107 (Fig. 2) to thereby prepare a circuit for energizing the selector stopping relay BN, if the carriage BN14 arrives at the seventh floor position while car A is there.

Assuming that the brush carriage BN14 now reaches a position corresponding to the seventh floor, the movable brush BN100 (Fig. 2) engages the stationary contact element BN107, thereby completing a circuit for the selector stopping relay BN, which circuit may be traced as follows, referring to Fig. 2:

L1; BSD4; BN; BN100; BN107; M107; M100; RN; X2; L2

Upon completion of the latter circuit, the selector stopping relay BN again closes to effect deceleration and stopping of the auxiliary motor BSM in the position corresponding to the seventh floor. As the brush carriage of the auxiliary selector for car B is now in a position corresponding to the seventh floor, a circuit is completed for the down zoning relay B7DS, which circuit may be traced as follows, referring to Fig. 3:

L1; BSD5; BN130; BN137; B7DS; L2

Upon completion of its circuit as traced above, the down zoning relay B7DS closes, thereby effecting closure of its contacts B7DS1 (Fig. 3) to thereby complete a holding circuit for itself; closing its contacts B7DS2 (Fig. 3) to prepare the demagnetizing coil B7DSN for subsequent energization; and closing its contacts B7DS3 (Fig. 3) in the circuit of floor lantern B7DL.

Returning to the operation of car A, as the latter car continues its movement in the downward direction, floors 6 to 3 are passed sequentially, and at each floor the previously energized zoning relay (not shown) corresponding to the zoning relay 7DS for the seventh floor, is deenergized in the manner described above in connection with the latter relay.

As car A arrives at a suitable slowdown distance in advance of the second floor, the operator rotates the master switch MS in the clockwise direction to its central position, thereby initially reinserting the accelerating resistor R1 (Fig. 2) in series with the main generator field winding GF to thereby cause the elevator motor MR to decelerate to low speed. Upon further clockwise movement of the master switch MS, the common energizing circuit of the down direction switch D and the brake relay N is interrupted to effect deenergization of the latter switch and relay. The down direction switch D in dropping out, disconnects the brake release winding EBW (Fig. 2) and the main generator field winding GF (Fig. 2). The brake relay M, in dropping out, establishes a circuit in parallel to that already existing for the floor lantern 2DL, and also completes a circuit for the demagnetizing winding 2DRN (Fig. 4) and the call relay 2DR, which circuit will be obvious from that traced above in connection with the call relay 2DR.

As car A arrives at the second floor, the movable contact brush M130 of the main floor selector for car A engages the stationary contact element M132 corresponding to the second floor (Fig. 3) and thereby completes a circuit for the demagnetizing winding 2DSN of the zoning relay 2DS for the second floor. The circuit for the demagnetizing coil 2DSN may be traced as follows, referring to Fig. 3:

L1; 2DS1; 2DS2; 2DSN; M132; M130; X3; L2

Upon completion of the latter circuit, the down zone relay 2DS for the second floor drops out opening its contacts 2DS1 (Fig. 3) which are at this time without effect; opening its contacts 2DS2 (Fig. 3) to thereby interrupt the circuit of the demagnetizing coil 2DSN; and opening its contacts 2DS3 (Fig. 3) to thereby deenergize the floor lantern 2DL, but inasmuch as car A is now stopped at the second floor, its relay M closes M1 and relights the floor lantern 2DL for the duration of the stop.

Returning now to consideration of the auxiliary selector SMS of car A which was started from the upper landing at the time car A was prepared for downward operation, inasmuch as no car was ahead of car A on the down side, the auxiliary selector proceeded without stopping until it arrived at its lower landing position, in which position it opened its lower limit switch SMB, thus deenergizing the down selector relay SD to open its contacts SD1 and SD2, thus stopping the motor SM. It will be recalled that the contacts AND1 in the parallel circuit for the relay SD were opened by car A leaving the upper landing.

By the foregoing description it will be seen that in the customary operation of such elevator systems with the cars being started from the dispatching floors or landings at selected intervals, the auxiliary selector of each car will travel ahead of that car up to the next car ahead and will thus cause the zone for its car to extend from that car to the next car ahead.

Figure 7:
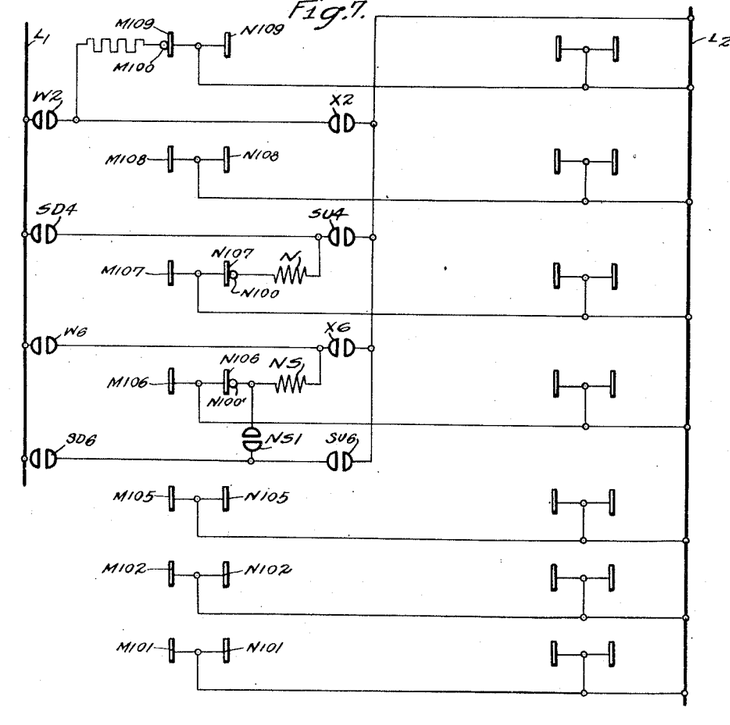
Fig. 7 is a diagrammatic view of a modification of the circuits for the stopping relays shown in Fig. 2.

Apparatus shown in Fig. 7

In some applications, it may be desirable to reduce the speed of the auxiliary floor selector driving motor, when the auxiliary selector brush carriage reaches a position one or more rows of segments in advance of that at which it is to stop, in order to avoid the possibility of over-run. Referring to Fig. 7, an auxiliary selector slow-down relay NS may be provided for this purpose. In the Fig. 7 modification, as car A approaches a floor at which another car, prepared for movement in the same direction is already located, the relay NS by means of brush N100' is energized to initially close and establish low speed connections (not shown) for the selector driving motor SM (shown in Fig. 2). Thereafter the selector stopping relay N operates to stop the motor SM.

We do not intend that the present invention shall be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In an elevator system having a plurality of cars operable in a hatchway past a plurality of floors; zoning apparatus for dividing said hatchway into zones of floors and for assigning said zones individually to said cars, said zoning apparatus including a circuit controlling device individual to each car for defining the forward limit of a zone assigned to said individual car, each of said circuit controlling devices comprising a plurality of contact elements corresponding to said floors, and a movable member arranged to operatively engage said contact elements sequentially in the order of corresponding floors; and means responsive to preparation of any selected car for movement for driving said movable member for said selected car, independently of movements of said selected car, into successive engagement with a plurality of said contact elements for floors in advance of said selected car.

2. In an elevator system having a plurality of cars operable in a hatchway past a plurality of floors; zoning apparatus for dividing said hatchway into zones of floors and for assigning said zones individually to said cars, said zoning apparatus including a circuit controlling device individual to each car for defining the forward limit of a zone assigned to said individual car, each of said circuit controlling devices comprising a plurality of contact elements corresponding to said floors, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective when a different car, in advance of said selected car, is prepared for movement in the same direction as said selected car, for arresting movement of said movable member for said selected car at a position having a fixed relationship to the hatchway position of said different car.

3. In an elevator system having a plurality of cars operable in a hatchway past a plurality of floors; a circuit controlling device for each individual car, each of said circuit controlling devices comprising an individual group of contact elements corresponding to said floors, and a movable member arranged to operatively engage said contact elements sequentially in the order of corresponding floors; position-responsive means associated with each of said cars, each of said position-responsive means including a contact device corresponding to each of said floors, and means for rendering each of said contact devices effective when the associated car is in a predetermined position with reference to the corresponding floor; a plurality of common circuits connecting certain of said contact elements of certain cars with certain of said contact devices of different cars; means effective when any selected car is prepared for movement for driving said movable member for said selected car, independently of movements of said selected car, into successive engagement with a plurality of said contact elements for floors in advance of said selected car; and means effective upon operative engagement of said movable member with any selected contact element for a given car, when said selected contact element is connected by one of said common circuits to one of said contact devices in effective condition for another car, to arrest movement of said movable member for said given car.

4. In an elevator system having a plurality of cars operable in a hatchway from a terminal past a plurality of floors; zoning apparatus for dividing said hatchway into zones of floors and for assigning said zones individually to said cars, said zoning apparatus including a circuit controlling device for each individual car for defining the forward limit of a zone assigned to said individual car, each of said circuit controlling devices comprising a plurality of contact elements corresponding to said floors, and a movable member arranged to operatively engage said contact elements sequentially in the order of corresponding floors; dispatching means for said cars; and means responsive to operation of said dispatching means for a selected car for causing movement of said movable member, for said selected car, into successive engagement with a plurality of said contact elements for floors in advance of said selected car.

5. In an elevator system having a plurality of cars operable in a hatchway from a terminal past a plurality of floors; zoning apparatus for dividing said hatchway into zones of floors and for assigning said zones individually to said cars, said zoning apparatus including a circuit controlling device for each individual car for defining the forward limit of a zone assigned to said individual car, each of said circuit controlling devices comprising a plurality of contact elements corresponding to said floors, and a movable member arranged to operatively engage said contact elements sequentially in the order of corresponding floors; dispatching means for said cars; means responsive to operation of said dispatching means for a selected car for causing movement of said movable member, for said selected car, into successive engagement with a plurality of said contact elements for floors in advance of said selected car; and means effective when a different car, in advance of said selected car, is prepared for movement in the same direction as said selected car, for arresting movement of said movable member for said selected car at a position having a fixed relationship to the hatchway position of said different car.

6. In an elevator system having a plurality of cars operable in a hatchway from a terminal past a plurality of floors; a circuit controlling device for each individual car, each of said circuit controlling devices comprising an individual group of contact elements corresponding to said floors, and a movable member arranged to operatively engage said contact elements sequentially in the order of corresponding floors; position-responsive means associated with each of said cars, each of said position-responsive means including a contact device corresponding to each of said floors, and means for rendering each of said contact devices effective when the associated car is in a predetermined position with reference to the corresponding floor; dispatching means for said cars; means responsive to operation of said dispatching means for a selected car for causing movement of said movable member, for said selected car, into successive engagement with a plurality of said contact elements for floors in advance of said selected car; and means controlled jointly by said circuit controlling device for any given car and said position-responsive means for said given car for assigning to said given car the zone of floors between the hatchway position corresponding to said movable member and the hatchway position corresponding to one of said contact devices in effective condition.

7. In an elevator system having a plurality of cars operable in a hatchway from a terminal past a plurality of floors; a circuit controlling device for each individual car, each of said circuit controlling devices comprising an individual group of contact elements corresponding to said floors, and a movable member arranged to operatively engage said contact elements sequentially in the order of corresponding floors; position-responsive means associated with each of said cars, each of said position-responsive means including a contact device corresponding to each of said floors, and means for rendering each of said contact devices effective when the associated car is in a predetermined position with reference to the corresponding floor; dispatching means for said cars; means responsive to operation of said dispatching means for a selected car for causing movement of said movable member, for said selected car, into successive engagement with a plurality of said contact elements for floors in advance of said selected car; means effective when a different car, in advance of said selected car, is prepared for movement in the same direction as said selected car, for arresting movement of said movable member for said selected car at a position having a fixed relationship to the hatchway position of said different car; and means controlled jointly by said circuit controlling device for said selected car and said position-responsive means for said selected car for assigning to said selected car the zone of floors between the hatchway position corresponding to said movable member for said selected car, and the hatchway position corresponding to one of said contact devices, for said selected car, in effective condition.

8. In an elevator system having a car operable in a hatchway past a plurality of floors; a plurality of electro-responsive elements corresponding to a plurality of said floors; a circuit controlling device comprising a plurality of contact elements, corresponding to said electro-responsive elements, and a movable member arranged to operatively engage said contact elements sequentially in the order of corresponding floors; means responsive to preparation of said car for movement for driving said movable member, independently of movements of said car, into successive engagement with a plurality of said contact elements for floors in advance of said car; position-responsive means operative by said car comprising a plurality of contact devices, corresponding to said electro-responsive elements, and means for rendering each of said contact devices effective when said car is in a predetermined position with reference to the corresponding floor; and means, controlled jointly by said circuit controlling device and said position-responsive means, for establishing a predetermined condition for said electro-responsive elements for floors between the hatchway position corresponding to said movable member and the hatchway position corresponding to one of said contact devices in effective condition.

9. In an elevator system having a car operable in a hatchway past a plurality of floors; a plurality of electro-responsive elements corresponding to a plurality of said floors; a circuit controlling device comprising a plurality of contact elements, corresponding to said electro-responsive elements, and a movable member arranged to operatively engage said contact elements sequentially in the order of corresponding floors; means responsive to preparation of said car for movement for driving said movable member, independently of movements of said car, into successive engagement with a plurality of said contact elements for floors in advance of said car; position-responsive means operative by said car comprising a plurality of contact devices, corresponding to said electro-responsive elements, and means for rendering each of said contact devices effective when said car is in a predetermined position with reference to the corresponding floor; and means, controlled jointly by said circuit controlling device and said position-responsive means, for rendering operable said electro-responsive elements for floors between the hatchway position corresponding to said movable member and the hatchway position corresponding to one of said contact devices in effective condition.

10. In an elevator system having a car operable in a hatchway past a plurality of floors; a plurality of relay elements corresponding to a plurality of said floors; a circuit controlling device comprising a plurality of contact elements, corresponding to said relay elements, and a movable member arranged to operatively engage said contact elements sequentially in the order of corresponding floors; means responsive to preparation of said car for movement for driving said movable member, independently of movements of said car, into successive engagement with a plurality of said contact elements for floors in advance of said car; means effective upon operative engagement of any of said contact elements for energizing the corresponding relay element; and means effective upon approach of said car to a floor for which the corresponding relay element is energized, for deenergizing the energized relay element.

11. In an elevator system having a plurality of cars operable in a hatchway past a plurality of floors; a group of electro-responsive elements individual to each of said cars, each of said groups comprising a plurality of elements corresponding to a plurality of said floors; a circuit controlling device individual to each car, each of said circuit controlling devices comprising an individual group of contact elements corresponding to said group of electro-responsive elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; a position-responsive means associated with each car and operative by that car, each of said position-responsive means including a contact device corresponding to each of said electro-responsive elements for the associated car, and means for rendering each of said contact devices effective when the associated car is in a predetermined position with reference to the corresponding floor; and means, controlled jointly by said circuit controlling device for any given car and said position-responsive means for said given car, for establishing a predetermined condition for said electro-responsive elements for said given car for the zone of floors between a position corresponding to said movable member for said given car and a position corresponding to any effective contact device of said position-responsive means for said given car.

12. In an elevator system having a plurality of cars operable in a hatchway past a plurality of floors; a group of electro-responsive elements individual to each of said cars, each of said groups comprising a plurality of elements corresponding to a plurality of said floors; a circuit controlling device individual to each car, each of said circuit controlling devices comprising an individual group of contact elements corresponding to said group of electro-responsive elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; a position-responsive means associated with each car and operative by that car, each of said position-responsive means including a contact device corresponding to each of said electro-responsive elements for the associated car, and means for rendering each of said contact devices effective when the associated car is in a predetermined position with reference to the corresponding floor; means, controlled jointly by said circuit controlling device for any given car and said position-responsive means for said given car, for establishing a predetermined condition for said electro-responsive elements for said given car for the zone of floors between positions corresponding to said movable member for said given car and a position corresponding to any effective contact device of said position-responsive means for said given car, and means controlled by the position-responsive means of said given car for preventing the establishment of said predetermined condition for said electro-responsive elements for other cars for said zone of floors.

13. In an elevator system having a plurality of cars operable in a hatchway past a plurality of floors; a group of electro-responsive elements individual to each of said cars, each of said groups comprising a plurality of elements corresponding to a plurality of said floors; a circuit controlling device individual to each car, each of said circuit controlling devices comprising an individual group of contact elements corresponding to said group of electro-responsive elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; a position-responsive means associated with each car and operative by that car, each of said position-responsive means including a contact device corresponding to each of said electro-responsive elements for the associated car, and means for rendering each of said contact devices effective when the associated car is in a predetermined position with reference to the corresponding floor; means, controlled jointly by said circuit controlling device for any given car and said position-responsive device for said given car, for rendering operable said electro-responsive elements for said given car for the zone of floors between the hatchway position corresponding to said movable member for said given car and the hatchway position corresponding to one of said contact devices for said given car, in effective condition, and means controlled by the position responsive means of said given car for preventing operation of said electro-responsive elements for other cars for said zone of floors.

14. In an elevator system having a plurality of cars operable in a hatchway past a plurality of floors; a group of relay elements individual to each of said cars, each of said groups comprising a plurality of elements corresponding to a plurality of said floors; a circuit controlling device individual to each car, each of said circuit controlling devices comprising an individual group of contact elements corresponding to said group of relay elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective upon operative engagement of any of said contact elements for energizing said relay element for the corresponding car and corresponding floor; and means effective upon operation of any given car in approaching and stopping at a floor for which said relay element for said given car is energized, for effective deenergization of the energized relay element.

15. In an elevator system having a plurality of cars operable in a hatchway past a plurality of floors; a group of electro-responsive elements individual to each of said cars, each of said groups comprising a plurality of elements corresponding to a plurality of said floors; a circuit controlling device individual to each car, each of said circuit controlling devices comprising an individual group of contact elements corresponding to said group of electro-responsive elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective when a different car, in advance of said selected car, is prepared for movement in the same direction as said selected car, for arresting movement of said movable member for said selected car at a position having a fixed relationship to the hatchway position of said different car; a position-responsive means associated with each car and operative by that car, each of said position-responsive means including a contact device corresponding to each of said electro-responsive elements for the associated car, and means for rendering each of said contact devices effective when the associated car is in a predetermined position with reference to the corresponding floor; and means, controlled jointly by said circuit controlling device for said selected car and said position-responsive means for said selected car, for establishing a predetermined condition for said electro-responsive elements for said selected car for the zone of floors between a position corresponding to said movable member for said selected car and a position corresponding to any effective contact device of said position-responsive means for said selected car.

16. In an elevator system having a plurality of cars operable in a hatchway past a plurality of floors; a group of electro-responsive elements, individual to each of said cars, each of said groups comprising a plurality of elements corresponding to a plurality of said floors; a circuit controlling device individual to each car, each of said circuit controlling devices comprising an individual group of contact elements corresponding to said group of electro-responsive elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective when a different car, in advance of said selected car, is prepared for movement in the same direction as said selected car, for arresting movement of said movable member for said selected car at a position having a fixed relationship to the hatchway position of said different car; a position-responsive means associated with each car and operative by that car, each of said position-responsive means including a contact device corresponding to each of said electro-responsive elements for the associated car, and means for rendering each of said contact devices effective when the associated car is in a predetermined position with reference to the corresponding floor; means, controlled jointly by said circuit controlling device for said selected car and said position-responsive means for said selected car, for establishing a predetermined condition for said electro-responsive elements for said selected car for the zone of floors between a position corresponding to said movable member for said selected car and a position corresponding to any effective contact device of said position-responsive means for said selected car, and means controlled by the position responsive means of said selected car for preventing the establishment of said predetermined condition for said electro-responsive elements for cars, other than said selected car, for said zone of floors.

17. In an elevator system having a plurality of cars operable in a hatchway past a plurality of floors; a group of relay elements individual to each of said cars, each of said groups comprising a plurality of elements corresponding to a plurality of said floors; a circuit controlling device individual to each car, each of said circuit controlling devices comprising an individual group of contact elements corresponding to said group of relay elements for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective when a different car, in advance of said selected car, is prepared for movement in the same direction as said selected car, for arresting movement of said movable member for said selected car at a position having a fixed relationship to the hatchway position of said different car; means effective upon operative engagement of any of said contact elements for energizing said relay element for the corresponding car and corresponding floor; and means effective upon approach of any given car to a floor for which said relay element for said given car is energized, for effecting deenergization of the energized relay element.

18. In an elevator system having a plurality of cars operable in a hatchway past a plurality of floors; an individual switch means for each floor, common to all of said cars, for registering calls for service; a group of zoning relays individual to each of said cars, each of said groups comprising a zoning relay for each of said floors; a circuit controlling device individual to each car, each of said circuit controlling devices comprising an individual group of contact elements corresponding to said group of zoning relays for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective upon operative engagement of any of said contact elements for energizing said zoning relay for the corresponding car and corresponding floor; means effective upon approach of any given car to a floor for which said zoning relay for said given car is energized, for effecting deenergization of the energized zoning relay; and electro-responsive means for a chosen car effective only when said switch means for a given floor is operated and said zoning relay for said chosen car and said given floor is energized.

19. In an elevator system having a plurality of cars operable in a hatchway past a plurality of floors, an individual switch means for each floor, common to all of said cars, for registering calls for service; a group of zoning relays individual to each of said cars, each of said groups comprising a zoning relay for each of said floors; a circuit controlling device individual to each car, each of said circuit controlling devices comprising an individual group of contact elements corresponding to said group of zoning relays for the individual car, and a movable member arranged to operatively engage said contact elements sequentially in the order of corresponding floors; means responsive to preparation of any selected car for movement for driving said movable member for said selected car, independently of movements of said selected car, into sucessive engagement with a plurality of said contact elements for floors in advance of said selected car; means effective upon operative engagement of any of said contact elements for energizing said zoning relay for the corresponding car and corresponding floor; means effective upon approach of any given car to a floor for which said zoning relay for said given car is energized, for effecting deenergization of the energized zoning relay; and an individual electro-responsive element for each of said cars and each of said floors, each of said electro-responsive elements being effective when said switch means for the corresponding floor is operated, and said zoning relay for the corresponding floor and the corresponding car is energized.

20. In an elevator system having a plurality of cars operable in a hatchway past a plurality of floors; an individual switch means for each floor, common to all of said cars, for registering calls for service; a group of zoning relays individual to each of said cars, each of said groups comprising a zoning relay for each of said floors; a circuit controlling device individual to each car, each of said circuit controlling devices comprising an individual group of contact elements corresponding to said group of zoning relays for the individual car, and a movable member arranged to operatively engage said contact elements sequentially in the order of corresponding floors; means responsive to preparation of any selected car for movement for driving said movable member for said selected car, independently of movements of said selected car, into successive engagement with a plurality of said contact elements for floors in advance of said selected car; means effective upon operative engagement of any of said contact elements for energizing said zoning relay for the corresponding car and corresponding floor; means effective upon approach of any given car to a floor for which said zoning relay for said given car is energized, for effecting deenergization of the energized zoning relay; and an individual floor lantern for each of said cars and each of said floors; and means for energizing each of said floor lanterns when said switch means for the corresponding floor is operated, and said zoning relay for the corresponding floor and the corresponding car is energized.

EDGAR M. BOUTON.
HAROLD W. WILLIAMS.
CHARLES F. CARNEY.